United States Patent Office 3,746,719
Patented July 17, 1973

3,746,719
4-SUBSTITUTED 2-AMINO-1,3,4-THIADIAZOLONES-(5) AND PROCESS FOR THEIR PREPARATION
Klaus Sasse, Schildgen, Germany, assignor to Bayer Aktiengesellschaft, Leverkusen, Germany
No Drawing. Filed Oct. 15, 1970, Ser. No. 81,119
Claims priority, application Germany, Oct. 25, 1969, P 19 53 811.5
Int. Cl. C07d 91/60
U.S. Cl. 260—306.8 D
24 Claims

ABSTRACT OF THE DISCLOSURE 4-substituted 2-amino-1,3,4-thiadiazolones of the formula

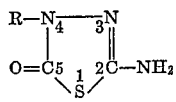

are prepared by reacting the corresponding 1-substituted thiosemicarbazide of the formula

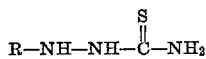

with phosgene, in the presence of water. Novel compounds are produced thereby.

---

The present invention relates to a novel process for the preparation of 4-substituted 2-amino-1,3,4-thiadiazolones-(5) and to novel compounds produced thereby.

It is known that 1,4-disubstituted thiosemicarbazides when acted on by phosgene are converted into 2-amino-1,3,4-thiadiazolones-(5) which contain a substituent in 4-position and at the amino group [Ber. Deutsch. Chem. Ges. 21, 2456 (1888); 23, 2821 (1890); 25, 3098 (1892), 32, 1081 (1899)]. Furthermore, it has been described [Ber. Deutsch. Chem. Ges. 21, 2456 (1886)] that, using the same reaction conditions, namely by the action of phosgene in toluene, there is formed from 1-phenyl-thiosemicarbazide a reaction product which does not melt below 270° C. and to which there was assigned the structure 2-amino-4-phenyl-1,3,4-thiadiazolone-(5) with an unsubstituted amino group. Reworking of this experiment showed that this reaction product consists of several components and does not contain in detectable amounts the true 2-amino-4-phenyl-1,3,4-thiadiazolone-(5) of melting point 152–153° C.

No 4-substituted 2-amino-1,3,4-thiadiazolone-(5) with an unsubstituted amino group has therefore been prepared up to now.

For the preparation of 2-amino-1,3,4-thiadiazolone-(5) unsubstituted in 4-position, two different processes have been described which are based on [Ber. Deutsch. Chem. Ges. 29, 2506 (1896)] heating 1-carbamoyl-thiosemicarbazide with concentrated hydrochloric acid or [J. Chem. Soc. 1958, 1508] heating thiosemicarbazide-1-carboxylic acid ethyl ester with acetic anhydride and subsequently hydrolyzing the reaction product acidically. These two processes could not be applied to the preparation of 2-amino-1,3,4-thiadiazolones-(5) substituted in 4-position.

The present invention provides a process for the production of a 2-amino-1,3,4-thiadiazolone-(5) substituted in the 4-position having the general formula

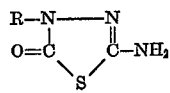

(I)

in which

R is unsubstituted or substituted aliphatic, cycloaliphatic, and aromatic hydrocarbyl; and
R is preferably alkyl or alkenyl of from 1 to 8 carbon atoms which may be substituted with alkoxy, cycloalkyl, cycloalkenyl, furyl or aryl which may itself be substituted by halogen, alkyl, dialkylamino, alkoxy and/or haloalkyl; or
R is cycloalkyl of from 3 to 12 carbon atoms; or
R is aryl which may be substituted with alkyl, halogen, haloalkyl, nitro and/or alkoxy. Most preferably, R is alkyl of from 1 to 8 carbon atoms or alkenyl of from 2 to 4 carbon atoms which may be straight-chain or branched and which may be substituted with one or more of alkoxy of from 1 to 4 carbon atoms, cycloalkyl or cycloalkenyl of from 3 to 12 ring members optionally additionally containing fused rings, furyl or phenyl or naphthyl which itself may be substituted by halogen, alkyl of from 1 to 4, carbon atoms, dialkylamino of from 1 to 4 carbon atoms in each alkyl moiety, alkoxy of from 1 to 4 carbon atoms, trifluoromethyl and/or difluorochloromethyl; or R is cycloalkyl of from 3 to 12 ring carbon atoms; or phenyl or naphthyl which may be substituted with halogen, alkyl of from 1 to 4 carbon atoms, alkoxy of from 1 to 4 carbon atoms, trifluoromethyl, difluorochloromethyl and/or nitro.

The process of this invention comprises reacting a 1-substituted thiosemicarbazide of the general formula

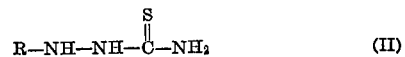  (II)

in which R has the meaning stated above, at a temperature above the ambient temperature, with phosgene in the presence of water and, optionally, in the additional presence of an inert organic solvent.

This process makes it possible to obtain the product of the general Formula I smoothly and in good yield.

In different aspect, this invention also provides novel compounds of the general Formula Ia below

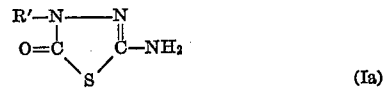

(Ia)

in which

R' is unsubstituted or substituted aliphatic, cycloaliphatic and aromatic hydrocarbyl; and
R' is preferably alkyl or alkenyl of from 1 to 8 carbon atoms which may be substituted with alkoxy, cycloalkyl, cycloalkenyl, furyl or aryl which may itself be substituted by halogen, alkyl, dialkylamino, alkoxy and/or haloalkyl; or
R' is cycloalkyl of from 3 to 12 carbon atoms; or
R' is aryl of more than six carbon atoms which may be substituted with alkyl, halogen, haloalkyl, nitro and/or alkoxy. Most preferably R' is alkyl of from 1 to 8 carbon atoms or alkenyl of from 2 to 4 carbon atoms which may be straight-chain or branched and which may be substituted with one or more of alkoxy of from 1 to 4 carbon atoms, cycloalkyl or cycloalkenyl of from 3 to 12 ring members optionally additionally containing fused rings, furyl or phenyl or naphthyl which itself may be substituted by halogen, alkyl of from 1 to 4 carbon atoms, dialkylamino of from 1 to 4 carbon atoms in each alkyl moiety, alkoxy of from 1 to 4 carbon atoms, trifluoromethyl and/or difluorochloromethyl; or R' is cycloalkyl of from 3 to 12 ring carbon atoms; or naphthyl which may be substituted with halogen, alkyl of from 1 to 4 carbon atoms, alkoxy of from 1 to 4 carbon atoms, trifluoromethyl, difluorochloromethyl and/or nitro.

It was very surprising that, in the conversion according to the invention, the reaction can proceed substantially homogeneously in the direction set forth whereas, an analogous reaction using exclusively organic solvent as a reaction medium, other products are formed.

If phosgene and 1-methylthiosemicarbazide are used as starting compounds in the process of the invention, the reaction course can be represented by the following formula scheme:

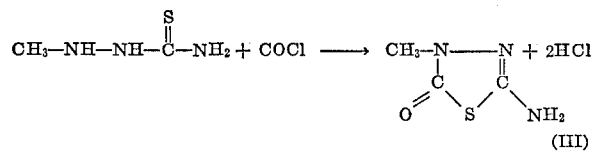

(III)

The 1-substituted thiosemicarbazides to be used as starting materials are defined generally by the Formula II.

As examples of the 1-substituted thiosemicarbazides which can be used in the process of the invention, there may be listed:

1-methyl-thiosemicarbazide
1-ethyl-thiosemicarbazide
1-propyl-thiosemicarbazide
1-isopropyl-thiosemicarbazide
1-butyl-thiosemicarbazide
1-sec.-butyl-thiosemicarbazide
1-(1,2,2-trimethyl-propyl)-thiosemicarbazide
1-(2-ethyl-hexyl-)-thiosemicarbazide
1-(2-ethoxy-ethyl)-thiosemicarbazide
1-allyl-thiosemicarbazide
1-butene-(2)-yl-thiosemicarbazide
1-(1-cyclopropyl-ethyl)-thiosemicarbazide
1-(cyclohexylmethyl)-thiosemicarbazide
1-cyclohexen-(3)-ylmethyl-thiosemicarbazide
1-benzyl-thiosemicarbazide
1-(4-chloro-benzyl-)-thiosemicarbazide
1-(2,4-dichlorobenzyl)-thiosemicarbazide
1-(4-methyl-benzyl)-thiosemicarbazide
1-(4-butyl-benzyl)-thiosemicarbazide
1-(4-methoxy-benzyl)-thiosemicarbazide
1-(4-dimethylamino-benzyl)-thiosemicarbazide
1-(4-trifluoromethyl-benzyl)-thiosemicarbazide
1-(1-phenyl-ethyl)-thiosemicarbazide
1-(2-phenyl-ethyl)-thiosemicarbazide
1-(3-phenyl-propyl)-thiosemicarbazide
1-(diphenylmethyl)-thiosemicarbazide
1-(1-naphthyl-(2)-ethyl)-thiosemicarbazide
1-furfuryl-thiosemicarbazide
1-cyclopropyl-thiosemicarbazide
1-cyclopentyl-thiosemicarbazide
1-cyclohexyl-thiosemicarbazide
1-(4-methyl-cyclohexyl)-thiosemicarbazide
1-cyclododecyl-thiosemicarbazide
1-tetrahydro-naphthyl-thiosemicarbazide
1-phenyl-thiosemicarbazide
1-(4-methyl-phenyl)-thiosemicarbazide
1-(4-chloro-phenyl)-thiosemicarbazide
1-(3,4-dichloro-phenyl)-thiosemicarbazide
1-(4-fluoro-phenyl)-thiosemicarbazide
1-(4-bromo-phenyl)-thiosemicarbazide
1-(4-iodo-phenyl)-thiosemicarbazide
1-(4-trifluoromethyl-phenyl)-thiosemicarbazide
1-(2-chloro-4-trifluoromethyl-phenyl)-thiosemicarbazide
1-(2-nitro-phenyl)-thiosemicarbazide
1-(2,4-dinitro-phenyl)-thiosemicarbazide
1-(4-methoxy-phenyl)-thiosemicarbazide
1-naphthyl-(1)-thiosemicarbazide
1-naphthyl-(2)-thiosemicarbazide Some of the thiosemicarbazides of Formula II are known, for example the thiosemicarbazides of Formula II in which R stands for methyl, ethyl, propyl, isopropyl, butyl, isobutyl, sec. butyl, tert.-butyl, cyclopentyl, benzyl, α-methyl-benzyl or phenyl [Acta. Chem. Scand. 22, 1 to 50 (1968), Ann. 212, 325 (1882) and J. Chem. Soc. 1950, 1582–1584]. The not yet known 1-substituted thiosemicarbazides can be prepared according to known general methods, for example, by reaction of monosubstituted hydrazines with salts of thiocyanic acid or by reduction of thiosemicarbazones with sodium tetrahydroborate.

In carrying out the reaction according to the invention the presence of water is of decisive importance. If the thiosemicarbazide is sufficiently water-soluble, at least at the working temperatures used, the reaction can be carried out in water alone. In the case of thiosemicarbazides more sparingly soluble in water, a water-immiscible organic solvent is desirably added and the reaction therefore carried out in a two-phase system. In the case of the two-phase system at least such an amount of water being equivalent to the amount of thiosemicarbazide used should be present.

Preferred organic solvents are those which have boiling points above the working temperature and which are not significantly modified by hydrogen chloride or phosgene. Preferably, therefore, hydrocarbons or chlorinated hydrocarbons are used, such as higher-boiling benzine fractions, benzene, toluene, xylene, carbon tetrachloride, hexachloroethane or chlorobenzene.

Since hydrogen chloride is liberated in the course of the reaction and hydrochloric acid is thereby formed in the aqueous phase, the reaction can be commenced from the outset in a mineral acid medium, for example in hydrochloric acid instead of in pure water.

Normally, no further auxiliary materials are required for the carrying out of the reaction. Sometimes, however, it may be advantageous, when working in a two-phase system, to add small amounts of emulsifiers to attain a better intermixing of the phases.

The reaction temperatures can be varied within a fairly wide range. In general, the reaction is carried out at 25 to 100° C., preferably 60 to 90° C.

In general, the reaction is carried out at normal pressure. The reaction may, however, be carried out in a closed vessel, and autogenous pressure permitted to build up; essentially the pressure increases by reason of the vapor pressure of the reaction medium, the hydrogen chloride liberated, or the carbon dioxide formed.

To give yields tending towards quantitative yields, at least an equimolar amount of phosgene, with reference to the thiosemicarbazide used, is employed. Since, however, in aqueous medium, a partial hydrolysis of the phosgene takes place to give hydrogen chloride and carbon dioxide, it is advisable to use phosgene in excess, an excess of 15 to 25% of the stoichiometric amount being preferred.

Working up may be effected in simple manner by filtration of the cooled reaction mixture. When working in a two-phase system, the yield can in many cases be increased by evaporating the separated organic phase.

The 2-amino-1,3,4-thiadiazolones-(5) substituted in 4-position are valuable intermediates for the preparation of pesticides. Some of them themselves have biocidal, for example herbicidal, properties, which is illustrated by the testing of 2-amino-4-phenyl- or 2-amino-4-cyclohexyl-1,3,4-thiadiazolone-(5) in the post-emergence test in Example A below.

Thus, the substances according to the invention are particularly suitable for completely destroying broad-leaf weeds, such as Sinapis, Chenopodium, Galinsoga and Stellaria. Dicotyledonous cultivated plants, such as beets and cotton, are, however, also damaged almost fatally. As against this graminaceous plants, such as wheat, oats and millet, are almost completely uninfluenced in their growth. Other 2-amino-1,3,4-thiadiazolones-(5) show a similar activity aspect, so that they can be used as selective weed killers in the cultivation of graminaceous plants, for example cereals.

The invention therefore provides a herbicidal composition containing as active ingredient a compound according to the invention or prepared by the process of the invention in admixture with a solid diluent or carrier or in admixture with a liquid diluent or carrier containing a surface-active agent. The diluent or carrier may be any of those known in the art. The concentration of active compound in such compositions is generally from 0.1 to 90% by weight.

The invention also provides a method of combating weeds which comprises applying to the weeds or a weed habitat a compound according to the invention or prepared by the process of the invention, alone or in the form of a composition containing as active ingredient such a compound in admixture with a solid or liquid diluent or carrier.

The invention is illustrated by the following examples.

EXAMPLE A

Post-emergence test

Solvent: 5 parts by weight acetone
Emulsifier: 1 part by weight of alkylaryl polyglycol ether To produce a suitable preparation of active compound, 1 part by weight of active compound was mixed with the stated amount of solvent, the stated amount of emulsifier was added and the concentrate was then diluted with water to the desired concentration.

Test plants which have a height of about 5–15 cm. were sprayed with the preparation of the active compound until just dew moist. After three weeks, the degree of damage to the plants was determined and characterized by the values 0–5, which have the following meaning:

0 no effect
1 a few slightly burned spots
2 marked damage to leaves
3 some leaves and parts of stalks partially dead
4 plant partially destroyed
5 plant completely dead.

The active compounds, their concentrations and the results obtained can be seen from the following table.

TABLE.—POST EMERGENCE TEST

| Active compound | Concentration of active compound, percent | Chenopodium | Sinapis | Oats | Wheat | Beans |
|---|---|---|---|---|---|---|
| 4-phenyl-2-amino-1,3,4-thiadiazolone-(5) | 0.2 | 4–5 | 4–5 | 2 | 1 | 2 |
| 4-cyclohexyl-2-amino-1,3,4-thiadiazolone-(5) | 0.2 | 4 | 4–5 | 2 | 2 | 1 |

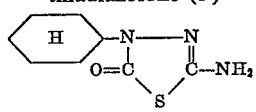

EXAMPLE 1

Preparation of 4-cyclohexyl-2-amino-1,3,4-thiadiazolone-(5)

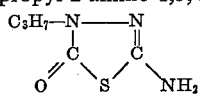

173 grams (1 mole) 1-cyclohexylthiosemicarbazide were suspended in 1250 ml. water. Heating to 80° was effected, and a total of 125 grams (=1.25 moles) phosgene was introduced for about 3 hours at this temperature. Cooling to 15° C. was effected, the reaction product was filtered off with suction and dried at 100° C. It was already in this form, chromatographically pure.

Yield: 145 grams (73% of the theory) 4-cyclohexyl-2-amino-1,3,4-thiadiazolone-(5), M.P.: 185° C. (butanol).

The 1-cyclohexylthiosemicarbazide required as starting products was prepared as follows:

171 grams (1 mole) cyclohexanonethiosemicarbazone were disssolved hot in a mixture of 350 ml. ethanol and 20 ml. water. At boiling temperature, a solution of 100 grams sodium tetrahydroborate in 200 ml. water was added dropwise within 2 hours. The mixture was boiled for 3 hours under reflux, then cooled, diluted with 300 ml. water, and neutralized with hydrochloric acid. The separated crystals were filtered off with suction and dried.

Yield: 130 grams (75% of the theory), M.P.: 145–146° C. (ethanol).

EXAMPLE 2

Preparation of 4-phenyl-2-amino-1,3,4-thiadiazolone-(5)

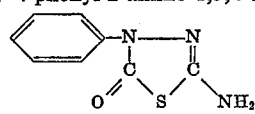

167 grams (1 mole) 1-phenylthiosemicarbazide were suspended in a mixture of 600 ml. water and 600 ml. toluene. Heating to 80° C. was effected and, at this temperature, 125 grams (1.25 moles) phosgene were introduced, with vigorous stirring. Cooling to 10–15° C. was then effected, and the crystalline product was filtered off with suction. Thi product was dried at 100° C. and then recrystallized from toluene, an insoluble portion remaining behind.

Yield: 91 grams (47% of the theory) 4-phenyl-2-amino-1,3,4-thiadiazolone-(5), M.P. 152–153° C.

The 1-phenylthiosemicarbazide required as starting product was known [Ann. 212, 325 (1882)].

EXAMPLE 3

Preparation of 4-propyl-2-amino-1,3,4-thiadiazolone-(5)

$$\begin{array}{c} C_3H_7-N\text{------}N \\ | \quad \quad \| \\ C \quad \quad C \\ \diagup \quad \diagdown \diagup \quad \diagdown \\ O \quad \quad S \quad \quad NH_2 \end{array}$$

133 grams (1 mole) 1-propylthiosemicarbazide were suspended in 1 liter of water of 80° C. At this temperature, 125 grams (1.25 moles) phosgene were introduced within 3 hours. The product precipitating after cooling was filtered off with suction and discarded after recrystallization from ethanol, it possesses a melting point of 200–202° C. and, in contrast to the expected product, was alkali-soluble; amount: 19 grams. The filtrate was evaporated in a vacuum, the residue remaining was recrystallized from a little water.

Yield: 68.5 grams (43% of the theory) 4-propyl-2-amino-1,3,4-thiadiazolone-(5), M.P. 79–80° C.

The 1-propylthiosemicarbazide required as starting product was prepared in a manner analogous to that described in Example 1.

In an analogous manner there can be prepared the following 2-amino-1,3,4-thiadiazolones-(5)

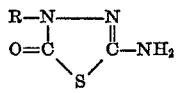

| Example No. | R | M.P. (° C.) |
|---|---|---|
| 4 | $C_2H_5$ | 106–108 |
| 5 | $(CH_3)_2CH$ | 138–139 |
| 6 | $n-C_4H_9$ | 208–210 |
| 7 | ⟨phenyl⟩–$CH_2$ | 240–242 |
| 8 | $Cl$–⟨phenyl⟩–$CH_2$ | 254–256 |

It will be appreciated that the instant specification and examples are set forth by way of illustration and not limitation, and that various modifications and changes may be made without departing from the spirit and scope of the present invention.

What is claimed is:

1. Process for the production of 4-substituted 2-amino 1,3,4-thiadiazolones-(5) of the formula

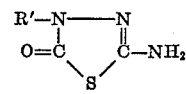

wherein

R is alkyl or alkenyl of up to 8 carbon atoms which may be straight-chain or branched and which may be substituted with one or more of alkoxy of from 1 to 4 carbon atoms, cycloalkyl or cycloalkenyl of from 3 to 12 ring members, furyl or phenyl or naphthyl which itself may be substituted by halogen, alkyl of from 1 to 4 carbon atoms, dialkylamino of from 1 to 4 carbon atoms in each alkyl moiety, alkoxy of from 1 to 4 carbon atoms, trifluoromethyl and/or difluorochloromethyl; or R is cycloalkyl of from 3 to 12 ring carbon atoms; or phenyl, naphthyl or tetrahydronaphthyl which may be substituted with halogen, alkyl of from 1 to 4 carbon atoms, alkoxy of from 1 to 4 carbon atoms, trifluoromethyl, difluochloromethyl and/or nitro which process comprises reacting the corresponding 1-substituted thiosemicarbazide of the formula

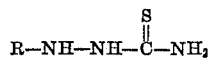

with phosgene, in the presence of water.

2. Process as claimed in claim 1 wherein said process is carried out at elevated temperature.

3. Process as claimed in claim 1 wherein said water is present in at least such an amount being equivalent to the amount of thiosemicarbazide used.

4. Process as claimed in claim 1 wherein there is used a reaction medium comprising water and a water-imiscible organic solvent, wherein said reaction medium contains at least equimolar amounts of water, relative to the amount of thiosemicarbazide used.

5. Process as claimed in claim 1 wherein said process is carried out at 25 to 100° C.

6. Process as claimed in claim 6 wherein the reaction temperature is 60 to 90° C.

7. Process as claimed in claim 1 wherein at least a stoichiometric amount of phosgene is used relative to the starting thiosemicarbazide.

8. Process as claimed in claim 8 wherein an excess up to 25 percent of the stoichiometric amount of phosgene is used.

9. Process as claimed in claim 1 wherein R is substituted or unsubstituted alkyl or alkenyl of from 1 to 8 carbon atoms wherein the substituents are selected from the group consisting of alkoxy, cycloalkyl, cycloalkenyl, furyl or aryl and wherein said substituents may be further substituted with halogen, alkyl, dialkyl amino, alkoxy and haloalkyl.

10. Process as claimed in claim 1 wherein R is cycloalkyl of from 3 to 12 carbon atoms.

11. Process as claimed in claim 1 wherein R is unsubstituted or substituted aryl in which the substituents are selected from the group consisting of alkyl, halogen, haloalkyl, nitro and/or alkoxy.

12. A 4-substituted-2-amino-1,3,4-thiadiazolone of the formula $$R'-N-N$$
$$O=C\quad C-NH_2$$
$$\diagdown S \diagup$$

wherein

R' is alkyl or alkenyl of up to 8 carbon atoms which may be straight-chain or branched and which may be substituted with one or more of alkoxy of from 1 to 4 carbon atoms, cycloalkyl or cycloalkenyl of from 3 to 12 ring members, furyl or phenyl or naphthyl which itself may be substituted by halogen, alkyl of from 1 to 4 carbon atoms, dialkylamino of from 1 to 4 carbon atoms in each alkyl moiety, alkoxy of from 1 to 4 carbon atoms, trifluoromethyl and/or difluorochloromethyl; or R is cycloalkyl of from 3 to 12 ring carbon atoms; or naphthyl or tetrahydronaphthyl which may be substituted with halogen, alkyl of from 1 to 4 carbon atoms, alkoxy of from 1 to 4 carbon atoms, trifluoromethyl, difluochloromethyl and/or nitro.

13. Compound as claimed in claim 12 wherein R' is aryl.

14. Compound as claimed in claim 13 wherein R' is aryl having more than 6 carbon atoms.

15. Compound as claimed in claim 12 wherein R' is cycloalkyl of from 3 to 12 carbon atoms.

16. Compound as claimed in claim 12 wherein R' is alkyl of from 1 to 8 carbon atoms.

17. Compound as claimed in claim 12 designated as 4-phenyl-2-amino-1,3,4-thiadiazolone-(5).

18. Compound as claimed in claim 12 designated as 4-cyclohexyl-2-amino-1,3,4-thiadiazolone-(5).

19. Compound as claimed in claim 12 designated as 4-propyl-2-amino-1,3,4-thiadiazolone-(5).

20. Compound as claimed in claim 12 designated as 4-ethyl-2-amino-1,3,4-thiadiazolone-(5).

21. Compound as claimed in claim 12 designated as 4-isopropyl-2-amino-1,3,4-thiadiazolone-(5).

22. Compound as claimed in claim 12 designated as 4-n-butyl-2-amino-1,3,4-thiadiazolone-(5).

23. Compound as claimed in claim 12 designated as 4-benzyl-2-amino-1,3,4-thiadiazolone-(5).

24. Compound as claimed in claim 12 designated as 4-(4'-chlorobenzyl)-2-amino-1,3,4-thiadiazolone-(5).

References Cited

UNITED STATES PATENTS 3,207,754  9/1965  Clarkson _____ 260—306.8 D

RICHARD J. GALLAGHER, Primary Examiner

U.S. Cl. X.R.

71—90; 260—552 SC

UNITED STATES PATENT OFFICE
CERTIFICATE OF CORRECTION

Patent No. 3,746,719    Dated July 17, 1973

Inventor(s) Klaus Sasse

It is certified that error appears in the above-identified patent and that said Letters Patent are hereby corrected as shown below:

Column 8, line 1, "claim 8" should read -- claim 1 --.

Signed and sealed this 16th day of July 1974.

(SEAL)
Attest:

McCOY M. GIBSON, JR.
Attesting Officer

C. MARSHALL DANN
Commissioner of Patents